(12) United States Patent
Eisenkraemer et al.

(10) Patent No.: US 8,625,201 B2
(45) Date of Patent: Jan. 7, 2014

(54) OPTICAL ELEMENT FOR DISTRIBUTING LIGHT

(75) Inventors: Frank Eisenkraemer, Biebertal (DE); Steffen Guenther, Lahnau (DE); Hans-Martin Heuck, Wetzlar (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 77 days.

(21) Appl. No.: 13/296,689

(22) Filed: Nov. 15, 2011

(65) Prior Publication Data

US 2012/0120500 A1     May 17, 2012

(30) Foreign Application Priority Data

Nov. 15, 2010   (DE) .................... 10 2010 060 558

(51) Int. Cl.
*G02B 27/14*     (2006.01)
(52) U.S. Cl.
USPC .......................................... 359/634; 359/631
(58) Field of Classification Search
USPC .................. 359/619, 630–634, 362
See application file for complete search history.

(56) References Cited

U.S. PATENT DOCUMENTS

| 5,708,530 A | 1/1998 | Huang |
| 7,586,827 B2* | 9/2009 | Hatano et al. ............ 369/112.16 |
| 2004/0240049 A1 | 12/2004 | Krueger |
| 2009/0207412 A1* | 8/2009 | Mahmood et al. ............ 356/406 |
| 2013/0021611 A1* | 1/2013 | Tsurutani ..................... 356/416 |

FOREIGN PATENT DOCUMENTS

| CH | 302963 A | 11/1954 |
| DE | 7739583 U1 | 5/1979 |
| DE | 10356890 B3 | 6/2005 |

* cited by examiner

*Primary Examiner* — Mohammed Hasan
(74) *Attorney, Agent, or Firm* — Patentbar International, P.C.

(57) ABSTRACT

An optical element for distributing light has a predefined spectral energy distribution in a predetermined working wavelength range. The optical element encompasses a transparent body into which the light enters, and a beam splitter layer embodied inside the transparent body, which layer has in the working wavelength range a predefined wavelength-dependent reflectance with which it reflects the light entering the transparent body in order to generate a reflected exit light bundle, and a wavelength-dependent transmittance with which it transmits the light entering the transparent body to generate a transmitted exit light bundle. The optical element encompasses a compensation layer arrangement, embodied on the transparent body separately from the beam splitter layer, whose transmittance with regard to the light passing through the compensation layer arrangement is defined as a function of the reflectance and transmittance of the beam splitter layer.

10 Claims, 11 Drawing Sheets

OPTICAL ELEMENT FOR DISTRIBUTING LIGHT

RELATED APPLICATIONS

This application claims priority to German Patent Application No. DE 10 2010 060 558.1, filed Nov. 15, 2010, which is incorporated herein by reference in its entirety.

FIELD OF THE INVENTION

The invention relates to an optical element for distributing light that has a predefined spectral energy distribution in a predetermined working wavelength range, having a transparent body into which the light enters, and having a beam splitter layer embodied inside the transparent body, which layer has in the working wavelength range a predefined wavelength-dependent reflectance with which it reflects the light entering the transparent body in order to generate a reflected exit light bundle, and a wavelength-dependent transmittance with which it transmits the light entering the transparent body in order to generate a transmitted exit light bundle. "Distribute" here means both the splitting of a light bundle into two different light bundles, and the combining of two light bundles into one common light bundle.

BACKGROUND OF THE INVENTION

In so-called comparison microscopes, which are utilized in particular in forensic investigations, two objects are compared with one another in two microscopes located next to one another. The two microscopes possess microscope optics of identical design that are connected to one another via an optical coupling apparatus that is also referred to as an "optical bridge." The left and right light bundles generated in the two microscope optics are combined via an optical element, usually a prism, arranged in the coupling apparatus. The two object images of the left and the right microscope optics can thus be viewed simultaneously in comparative fashion, selectably next to one another or superimposed onto one another, via an eyepiece and/or a camera.

If the two objects to be viewed in comparative fashion are parts of one and the same specimen, e.g. parts of a torn sheet of paper, the object images generated by the two microscope optics should produce the same color impression on the viewer. For this, the optical element that combines, in the optical bridge, the two light bundles generated by the two microscope optics must possess sufficiently precise color uniformity and, ideally, also a high degree of color fidelity.

"Color uniformity" is to be understood here as the ability of the optical element to influence the spectral energy distributions of the two light bundles passing through the optical element in identical fashion spectrally, i.e. as a function of wavelength. This means that in terms of the light bundles passing through, the optical element in its entirety must exhibit transmittance values that match in the predetermined working wavelength range (if applicable, except for a wavelength-independent constant). In other words, the two light bundles may experience wavelength-dependent changes in their spectral energy distributions as they pass through the optical element, but those changes are the same for both light bundles.

"Color fidelity," on the other hand, is to be understood as the ability of the optical element to modify the spectral energy distributions of the two light bundles passing through the optical element, in the working wavelength range (if at all), in identical fashion for all wavelengths. This means that in terms of the two light bundles passing through the optical element, the element in its entirety has transmittance values that are constant in the working wavelength range.

In an optical element of the kind described above, combining of the light bundles is usually brought about by means of a beam splitter layer, arranged inside a transparent body, that reflects a portion of the respective light bundle with a predefined reflectance and transmits a portion of the light bundle with a predefined transmittance. The light bundles can be combined in the desired fashion by being suitably directed onto this beam splitter layer and then respectively reflected and transmitted there.

It is problematic in this regard that the reflectance and transmittance of a beam splitter layer of this kind as a rule are not constant within the working wavelength range, but instead vary significantly with the light wavelength. The beam splitter layer thus cannot be manufactured with the desired properties such as color uniformity and color fidelity. The beam splitter layer instead influences the incident light bundle, in accordance with its spectral reflectance and transmittance, in such a way that the spectral energy distributions of the light bundles, which are still identical before entering the optical element, differ so greatly from one another after passing through the optical element that the objects imaged by the light bundles are reproduced in color-distorted fashion. This property of the beam splitter layer (or of the optical element containing the beam splitter) is referred to hereinafter simply as "color error."

US 2004/0240049 A1 describes a method in which two light bundles are combined via a prism. To achieve improved color fidelity, the entering light bundles are split and recombined by a complex prism geometry. This method is disadvantageous in that troublesome white light interference can occur as a result of the splitting and recombination of the light bundles.

CH 302963 describes a beam splitter that is made up of multiple mirrors whose surfaces are furnished with metallic reflection coatings in order to achieve color uniformity. This minor system is not very compact because of the number of its separate components, and is therefore difficult to integrate into optical devices.

DE 103 56 890 describes a method in which, for a system constituted from a light source, a beam splitter, and a detector, color uniformity is achieved with the use of bandpass filters. This method is disadvantageous in that it is applicable only specifically to the overall system in question, including the light source and detector. In addition, it may prove troublesome in certain applications that spectral light components are filtered out of the usable light by the bandpass filters.

SUMMARY OF THE INVENTION

An object of the invention is to describe an optical element for distributing light that, with a simple configuration, achieves a color uniformity that is necessary in particular for comparative viewing of objects.

The invention achieves this object by means of a compensation layer arrangement, embodied on the transparent body separately from the beam splitter layer, whose transmittance with regard to the light passing through the compensation layer arrangement is defined as a function of the reflectance and transmittance of the beam splitter layer in such a way that the reflected exit light bundle and the transmitted exit light bundle have, within the working wavelength range, matching spectral energy distributions that differ from one another at most by an amount equal to a wavelength-independent offset value.

The compensation layer arrangement according to the present invention influences the light passing through it in such a way that color uniformity is created between the exit light bundle reflected at the beam splitter layer and the exit light bundle transmitted through the beam splitter layer. For this purpose, the transmittance of the compensation layer arrangement is adjusted in wavelength-dependent fashion in such a way that it exactly compensates for the differences that are caused between the spectral energy distributions of the two light bundles by the wavelength dependency of the transmittance and reflectance of the beam splitter layer.

The compensation layer ensures that the spectral energy distributions of the two exit light bundles match one another except for a wavelength-independent offset value. This offset value is preferably equal to zero. If it is not, a difference in brightness does occur between the two exit light bundles, but color uniformity is ensured in every case.

The compensation layer arrangement is embodied directly on the transparent body of the optical element. The latter thus constitutes, considered independently, an element corrected for color uniformity, which requires no further optical components in order to achieve the desired property and can therefore easily be integrated into existing optical devices in order to distribute light therein in the desired color-uniform manner. The optical element according to the present invention is beneficially usable in particular in comparison microscopy, in which what is important is to image two objects in color-uniform fashion by means of two light bundles that are at first separate and are then combined in the optical element.

The transmittance of the compensation layer arrangement is preferably defined so that the reflected exit bundle and the transmitted exit bundle have, within the working wavelength range, spectral energy distributions that respectively match the predefined spectral energy distribution of the light entering the optical element, and differ therefrom at most by an amount equal to a constant offset value. In this embodiment the optical element is not only color-uniform but also color-faithful. This means that the light emerging from the optical element exhibits no color cast as compared with the light entering the optical element.

The compensation layer arrangement preferably encompasses at least one dielectric reflection-reducing layer. Such dielectric layers can be adapted flexibly and precisely to the color error caused by the beam splitter layer.

In a further advantageous embodiment, provision is made that the optical element is a prism, embodied to combine a first and a second entrance light bundle, whose transparent body has a first light entrance surface, a second light entrance surface, and a light exit surface; the compensation layer arrangement encompasses a first compensation layer embodied on the first light entrance surface and a second compensation layer embodied on the second light entrance surface; the beam splitter layer reflects the first entrance light bundle entering through the first light entrance surface furnished with the first compensation layer onto the light exit surface of the transparent body in order to generate the reflected exit light bundle, and transmits the entrance light bundle entering through the second light entrance surface furnished with the second compensation layer onto the light exit surface in order to generate the transmitted exit light bundle; and within the working wavelength range, the following condition (1) is met:

$$T_1(\lambda) * R_{STS}(\lambda) = T_2(\lambda) * T_{STS}(\lambda) + c1 \qquad (1),$$

in which $T_1(\lambda)$ designates the wavelength-dependent transmittance, at a wavelength $\lambda$, of the first light entrance surface furnished with the first compensation layer, $T_2(\lambda)$ designates the wavelength-dependent transmittance, at wavelength $\lambda$, of the second light entrance surface furnished with the second compensation layer, $R_{STS}(\lambda)$ designates the wavelength-dependent reflectance, at wavelength $\lambda$, of the beam splitter layer, $T_{STS}(\lambda)$ designates the wavelength-dependent transmittance, at wavelength $\lambda$, of the beam splitter layer, and c1 designates a constant where $-1 < c1 < 1$.

With this embodiment, the optical element according to the present invention constitutes a prism that combines in color-uniform fashion two light bundles entering the element separately. For this purpose the element comprises, as it were, two inputs in the form of the two light entrance surfaces, as well as one output in the form of the light exit surface. In accordance with condition (1), correction of the color error caused by the beam splitter surface is distributed over the two inputs. Configured for this purpose at each of these inputs is a compensation layer whose transmittance is adjusted so that it counteracts the color error caused by the beam splitter surface. The constant c1 indicated in condition (1) reflects the fact that color uniformity is produced even when the reflected exit light bundle and the transmitted exit light bundle differ from one another by a constant offset value. The two aforementioned exit light bundles thus differ from one another not in their spectral composition, but in their brightness, when constant c1 is not equal to zero.

Compensation in accordance with condition (1) for the color error caused by the beam splitter layer can also occur by the fact that a compensation layer designed specifically for that color error is applied onto only one of the two light entrance surfaces, while the other light entrance surface is furnished with a conventional spectrally neutral reflection-reducing layer. In this case the color error is compensated for solely by the correspondingly adapted wavelength-dependent transmittance of the single compensation layer, while the conventional reflection-reducing layer exhibits a largely constant transmittance in the working wavelength range. Furnishing a single compensation layer has the advantage of a certain cost reduction. On the other hand, a compensation layer arrangement having two compensation layers on both light entrance surfaces offers the possibility of more effectively avoiding troublesome back-reflections occurring at the light entrance surfaces.

The compensation layer arrangement preferably further encompasses a third compensation layer that is embodied on the light exit surface of the transparent body, the following condition (2) preferably being met within the working wavelength range:

$$T_1(\lambda) * R_{STS}(\lambda) * T_3(\lambda) = c2 \qquad (2),$$

in which $T_3(\lambda)$ designates the wavelength-dependent transmittance, at wavelength $\lambda$, of the light exit surface furnished with the third compensation layer, and c2 designates a constant where $0 < c2 < 1$.

In this embodiment, the third compensation layer ensures that the optical element embodied as a prism is not only color-uniform but also color-faithful. In particular, the result of wavelength-dependent transmittance according to condition (2) of the light exit surface furnished with the third compensation layer is that the transmittance with which the prism acts in its entirety on the two entrance light bundles loses its wavelength dependence. The color fidelity of the prism is thereby achieved.

Without the aforementioned third compensation layer, color fidelity can also be attained by the fact that the first and the second compensation layer that are embodied respectively on the first and the second light entrance surface of the prism meet the following respective conditions (3) and (4):

$$T_1(\lambda) * R_{STS}(\lambda) = c3 \tag{3}$$

$$T_2(\lambda) * T_{STS}(\lambda) = c4 \tag{4},$$

in which
c3 designates a constant where $0<c3<1$, and
c4 designates a constant where $0<c4<1$.

As compared with the embodiment explained previously in which the prism comprises three compensation layers, this refinement having only two compensation layers has once again the advantage of a cost decrease. It is necessary to accept in return, however, that more light is reflected at the compensation layers as a consequence of the smaller number of compensation layers, with the result that greater residual reflections occur than with three or more compensation layers. This can be explained by the fact that the reflection attained by way of the compensation effect according to the present invention can be kept lower if it is distributed over more compensation layers.

In an alternative embodiment, provision is made that the optical element is a beam splitter embodied to split an entrance light bundle into the transmitted exit light bundle and the reflected exit light bundle, the transparent body of which beam splitter has a light entrance surface, a first light exit surface, and a second light exit surface; that the compensation layer arrangement encompasses a first compensation layer embodied on the first light exit surface and a second compensation layer embodied on the second light exit surface; that the beam splitter layer reflects a portion of the entrance light bundle entering through the light entrance surface onto the first light exit surface in order to generate the reflected exit light bundle, and transmits a portion of the entrance light bundle entering through the light entrance surface onto the second light exit surface in order to generate the transmitted exit light bundle; and that within the working wavelength range the following condition (5) is met:

$$R_{STS}(\lambda) * T_1(\lambda) = T_{STS}(\lambda) * T_2(\lambda) + c5 \tag{5},$$

in which
$R_{STS}(\lambda)$ designates the wavelength-dependent reflectance of the beam splitter layer at wavelength $\lambda$,
$T_{STS}(\lambda)$ designates the wavelength-dependent transmittance of the beam splitter layer at wavelength $\lambda$,
$T_1(\lambda)$ designates the wavelength-dependent transmittance, at wavelength $\lambda$, of the first light exit surface furnished with the first compensation layer,
$T_2(\lambda)$ designates the wavelength-dependent transmittance, at wavelength $\lambda$, of the second light exit surface furnished with the second compensation layer, and
c5 designates a constant where $-1<c5<1$.

In this embodiment the optical element according to the present invention thus functions as a beam splitter that divides an entrance light bundle into two exit light bundles that leave the optical element via two different light exit surfaces. Because these two light exit surfaces are embodied in accordance with condition (5), the optical element possesses the desired color uniformity.

In the context of the beam splitter recited above, within the working wavelength range the following conditions (6) and (7) are preferably met:

$$R_{STS}(\lambda) * T_1(\lambda) = c6 \tag{6}$$

$$T_{STS}(\lambda) * T_2(\lambda) = 1 - c6 \tag{7},$$

in which
c6 designates a constant where $0<c6<1$.

The fact that the two compensation layers additionally meet conditions (6) and (7) ensures the color fidelity of the beam splitter.

According to a further aspect of the invention, provision is made for an optical device for comparative viewing of two objects according to Claim 9. This device comprises the optical element, embodied as a prism, according to one of Claims 4 to 6 in order to combine two entrance light bundles into one exit light bundle for comparative viewing of two objects.

In an advantageous embodiment of the optical device, the optical coupling apparatus comprises an optical element, arranged after the prism and embodied as a beam splitter, according to Claim 7 or 8 in order to split the exit light bundle generated by the prism.

The optical element according to the present invention is usable not only in a device of the kind recited above, but also in any other optical devices, for example in so-called multi-viewers, i.e. in devices that enable multiple users to view an object simultaneously (for example, via multiple eyepieces).

BRIEF DESCRIPTION OF THE DRAWINGS

The invention will be further explained below with reference to the Figures, in which.

DETAILED DESCRIPTION OF THE PREFERRED EMBODIMENTS

Exemplifying embodiments of the optical element according to the present invention will be described below with reference to the Figures.

Figure 1:
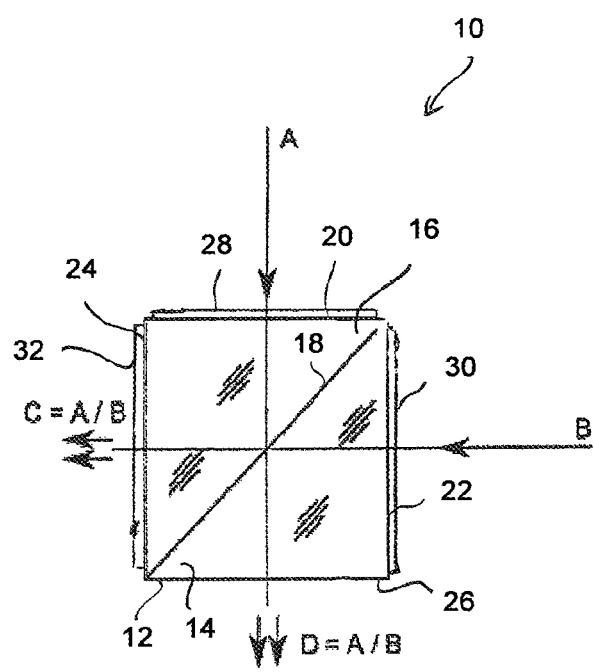
FIG. 1 schematically depicts an optical element according to a first exemplifying embodiment embodied as a combining prism.

FIG. 1 schematically depicts an optical element 10 according to a first exemplifying embodiment, which is embodied as a prism and serves to combine two light bundles A and B. It is referred to hereinafter as a "combining prism."

Combining prism 10 encompasses a transparent body 12, e.g. a glass body, that is assembled from two transparent prism parts 14 and 16. A beam splitter layer 18 is embodied at the interface between the two prism parts 14 and 16, i.e. within transparent body 12.

Combining prism 10 has a first light entrance surface 20 into which first light bundle A enters, and a second light entrance surface 22 into which second light bundle 2 enters. One portion of first light bundle A is reflected at beam splitter layer 18, and another portion passes through beam splitter layer 18. The proportion of the light reflected at beam splitter layer 18 and the proportion of the light passing through beam splitter layer 18 (i.e. transmitted) depend respectively on the reflectance and transmittance of beam splitter layer 18. This is correspondingly the case for second light bundle B entering into second light entrance surface 22, which is likewise, in accordance with the reflectance and transmittance of beam splitter layer 18, correspondingly respectively reflected thereat and transmitted therethrough.

Combining prism 10 further comprises a first light exit surface 24 and a second light exit surface 26. The portion of light bundle A reflected at beam splitter layer 18, hereinafter referred to as the "reflected exit light bundle," and the portion of second light bundle B passing through beam splitter layer 18, hereinafter referred to as the "transmitted exit light bundle," emerge together from first light exit surface 24. The reflected exit light bundle and the transmitted exit light bundle are thus combined by beam splitter layer 18. These combined exit bundles are labeled "C=A/B" in FIG. 1.

Correspondingly, the portion of first entrance light bundle A that passes through beam splitter layer 18, and the portion of second entrance light bundle B that is reflected at beam splitter 18, are combined by beam splitter layer 18 and emerge together from second light exit surface 26. This is labeled "D=A/B" in FIG. 1.

The manner in which the desired color fidelity is imparted to combining prism 10 depicted in FIG. 1 will first be presented below.

In the present exemplifying embodiment, color fidelity is attained by the fact that a first compensation layer 28 is applied onto first light entrance surface 20, and a second compensation layer 30 onto second light entrance surface 22. The two compensation layers 28 and 30 meet the following condition (1):

$$T_1(\lambda)*R_{STS}(\lambda)=T_2(\lambda)*T_{STS}(\lambda)+c1 \quad (1).$$

In condition (1), $T_1(\lambda)$ designates the wavelength-dependent transmittance of first light entrance surface 20 furnished with first compensation layer 28, $T_2(\lambda)$ designates the wavelength-dependent transmittance of second light entrance surface 22 furnished with second compensation layer 30, $R_{STS}(\lambda)$ designates the wavelength-dependent reflectance of beam splitter layer 18, and $T_{STS}(\lambda)$ designates the wavelength-dependent transmittance of beam splitter layer 18; and c1 is a constant such that $-1<c1<1$. Condition (1) is intended to apply for all wavelengths $\lambda$ within a predetermined working wavelength range.

Condition (1) expresses the fact that the spectral energy distribution of the exit light bundle reflected at beam splitter layer 18 matches (except for the wavelength-independent constant c1) the spectral energy distribution of the exit light bundle transmitted through beam splitter layer 18. The reflected exit light bundle is constituted by that part of first light entrance bundle A which is firstly transmitted through first light entrance surface 20 furnished with first compensation layer 28, and then reflected at beam splitter surface 18. The transmitted exit light beam is constituted by that part of second light entrance bundle B which is firstly transmitted through light entrance surface 22 furnished with compensation layer 30, and then transmitted through beam splitter layer 18.

In the example described above, the two light entrance surfaces 20 and 22 constitute two inputs of combining prism 10, while first light exit surface 24 represents the only effective output of combining prism 10. It is, however, likewise possible to use second light exit surface 26 as an effective output of combining prism 20. In this case the following condition (1') applies in order to attain color uniformity:

$$T_1(\lambda)*T_{STS}(\lambda)=T_2(\lambda)*R_{STS}(\lambda)+c1',$$

where c1' is a constant such that $-1<c1'<1$.

Figure 2:
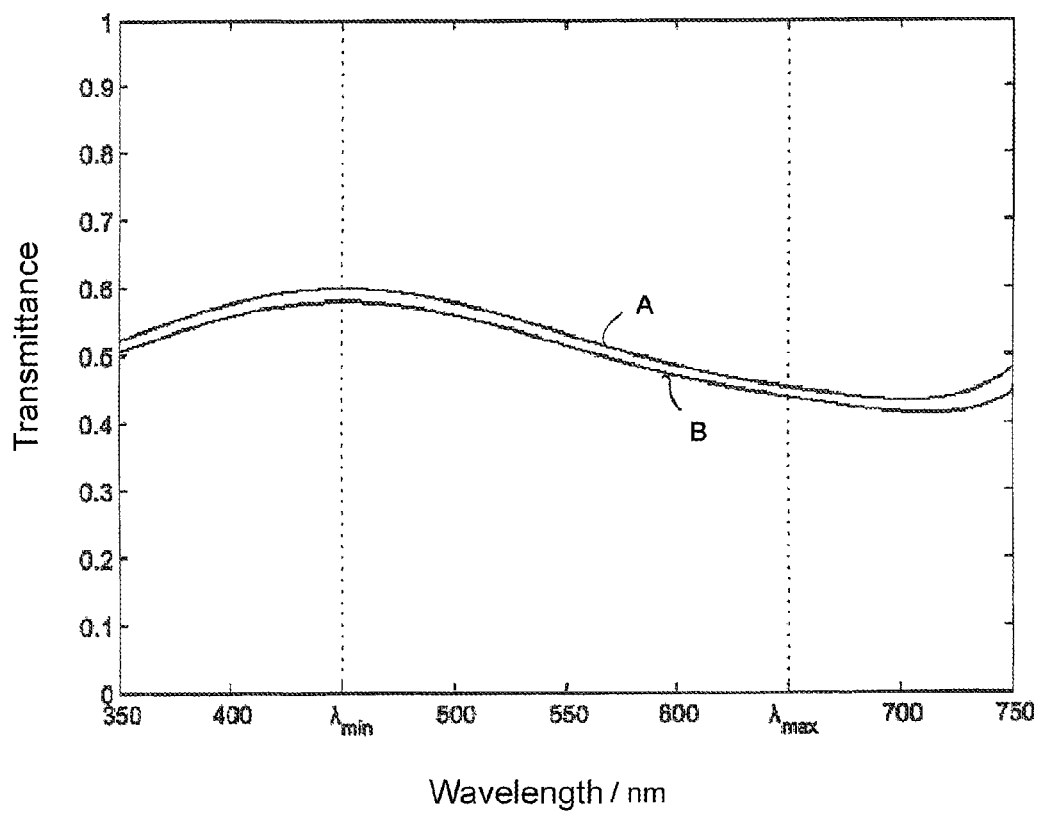
FIG. 2 is a diagram to explain color uniformity.

The color uniformity that is attained is illustrated in FIG. 2, which depicts, as a function of light wavelength, the transmittance values with which combining prism 10 acts in its entirety on the two light entrance bundles A and B. As FIG. 2 shows, the transmittance values in the working wavelength range defined by the limit wavelengths $\lambda_{min}$ and $\lambda_{max}$ match one another, except for a parallel offset. The aforementioned parallel offset corresponds to constant c1 indicated in condition (1). It results in a brightness difference, harmless in terms of the presence of color uniformity, between the object images generated by the two light entrance bundles A and B.

In order to correct combining prism 10, which is corrected for color uniformity in the manner explained above, for color fidelity as well, in addition to the two compensation layers 28 and 30 a third compensation layer 32 can be furnished at light exit surface 24, said layer meeting the following condition (2):

$$T_1(\lambda)*R_{STS}(\lambda)*T_3(\lambda)=c2 \quad (2).$$

In condition (2), $T_3(\lambda)$ designates the wavelength-dependent transmittance, at wavelength $\lambda$, of light exit surface 24 furnished with third compensation layer 32, and c2 designates a constant such that $0<c2<1$.

If condition (2) is met over the entire working wavelength range, the result of third compensation layer 32 is then that the transmittance with which combining prism 10 acts in its entirety on the two light entrance bundles A and B no longer exhibits a wavelength dependence.

Figure 3:
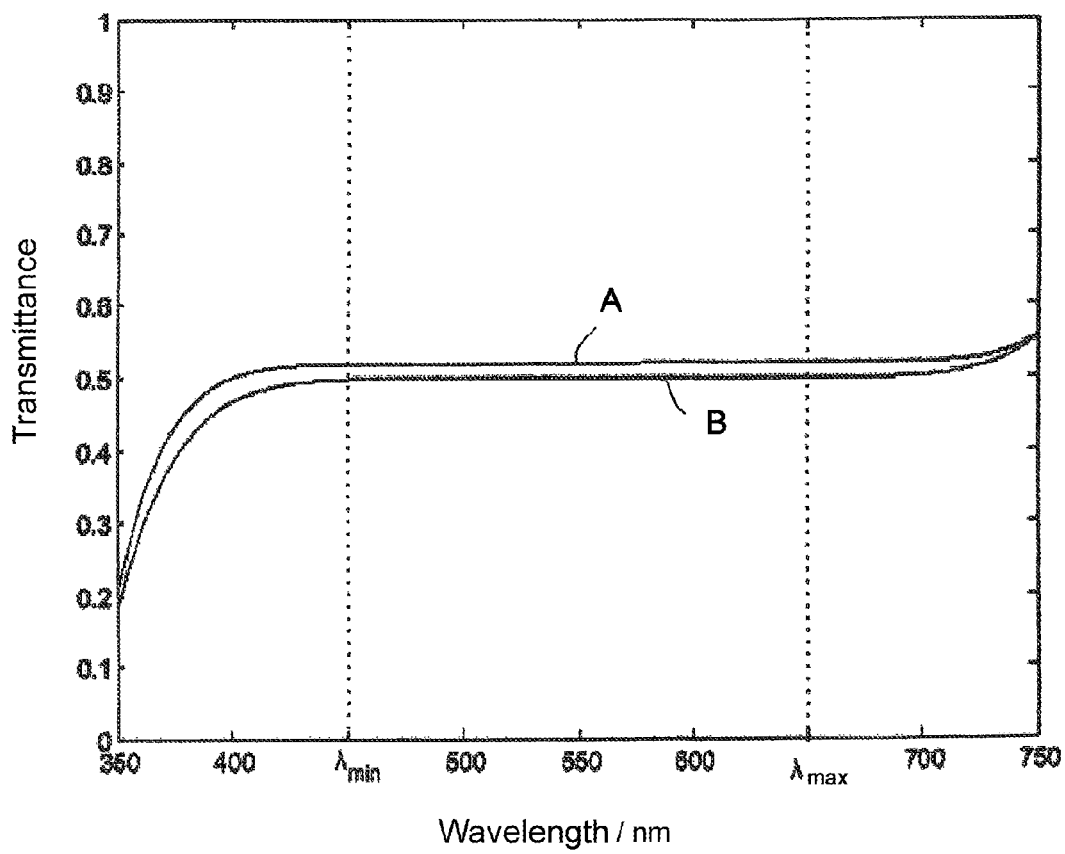
FIG. 3 is a diagram to explain color fidelity.

The color fidelity achieved is illustrated in FIG. 3, in which the transmittance values with which combining prism 10 acts in its entirety on the two light entrance bundles A and B is depicted as a function of light wavelength. As FIG. 3 shows, the transmittance values are constant in the working wavelength range defined by the limit wavelengths $\lambda_{min}$ and $\lambda_{max}$. The parallel offset that is present in FIG. 3 between these two transmittance values corresponds to constant c2 indicated in condition (2). It once again results in a brightness difference, harmless in terms of the presence of color fidelity, between the object images generated by the two light entrance bundles A and B.

If what is used as the output of combining prism 10 is not first light exit surface 24 but second light exit surface 26, third compensation layer 32 must then correspondingly be furnished not on first light exit surface 24 but on second light exit surface 26. In this case the modified condition (2') is sufficient:

$$T_1(\lambda) * T_{STS}(\lambda) * T_3(\lambda) = 1 - c2.$$

Figure 4:
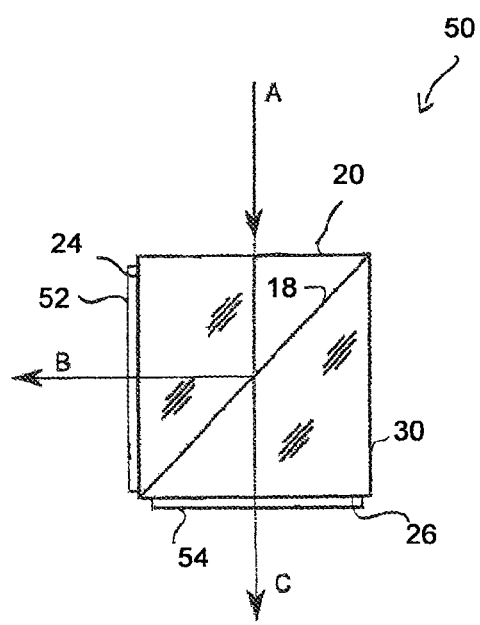
FIG. 4 schematically depicts an optical element according to a second exemplifying embodiment embodied as a beam splitter.

FIG. 4 depicts, as a second exemplifying embodiment, an optical element 50 that corresponds in its basic construction to element 10 but functions not as a combining prism but as a beam splitter.

In contrast to combining prism 10 shown in FIG. 1, in the case of the beam splitter according to FIG. 4 the first light entrance surface 20 constitutes the only effective entrance surface. With surfaces 24 and 26, however, beam splitter 50 has two effective light exit surfaces. Beam splitter layer 18 ensures that a portion of light entrance bundle A is reflected toward first light exit surface 24, while another portion passes through beam splitter layer 18 and is incident onto second light exit surface 26. The portion of light bundle A reflected at beam splitter layer 18 is labeled B in FIG. 4 and, in this exemplifying embodiment, constitutes the reflected exit light bundle. The portion of light bundle A that passes through beam splitter layer 18 is labeled C in FIG. 4 and constitutes the transmitted exit light bundle.

In order to bring about color uniformity for beam splitter 50, a first compensation layer 52 is applied onto first light exit surface 24 and a second compensation layer 54 onto second light exit surface 26, which layers meet the following condition (5):

$$R_{STS}(\lambda) * T_1(\lambda) = T_{STS}(\lambda) * T_2(\lambda) + c5 \quad (5).$$

In condition (5), $T_1(\lambda)$ designates the wavelength-dependent transmittance of first light exit surface 24 furnished with first compensation layer 52, and $T_2(\lambda)$ designates the wavelength-dependent transmittance of second light exit surface 26 furnished with second compensation layer 54. Also in condition (5), c5 once again designates a constant such that $-1 < c5 < 1$.

In order to embody beam splitter 50 with not only color uniformity but also color fidelity, light exit surfaces 24, 26 furnished respectively with compensation layers 52 and 54 must meet the following conditions (6) and (7):

$$R_{STS}(\lambda) * T_1(\lambda) = c6 \quad (6)$$

$$T_{STS}(\lambda) * T_2(\lambda) = c6 \quad (7),$$

In conditions (6) and (7), c6 designates a constant such that $0 < c6 < 1$.

Figure 5:
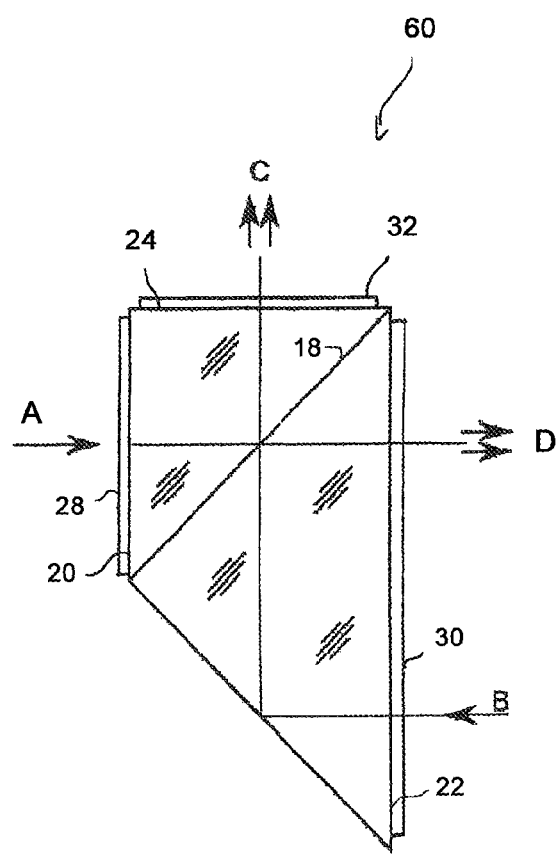
FIG. 5 schematically depicts an optical element according to a third exemplifying embodiment embodied as a combining prism.

FIG. 5 depicts, as a third exemplifying embodiment, an optical element 60 that once again functions as a combining prism for combining two light bundles A and B. Combining prism 60 corresponds in terms of its function to combining prism 10 shown in FIG. 1. Conditions (1), (1'), and (2) also apply correspondingly to combining prism 60 in terms of the desired prism properties such as color uniformity and color fidelity. Those components of combining prism 60 according to FIG. 5 that correspond to those of combining prism 10 shown in FIG. 1 are labeled with the reference characters used in the first exemplifying embodiment.

Combining prism 60 according to the third exemplifying embodiment differs from combining prism 10 according to the first exemplifying embodiment only in terms of the shape of its transparent body 12, as well as the arrangement of its surfaces 20, 22, and 24 furnished with compensation layers 28, 30, 32. In the case of combining prism 60, the transmitted exit light bundle labeled C, which is constituted from the portion of incident light bundle A reflected at beam splitter layer 18 and the portion of incident light bundle B transmitted through beam splitter layer 18, is used as an effective light bundle, while the exit light bundle labeled D remains unused and is absorbed, for example, by a beam block (not shown in FIG. 5).

In FIGS. 6 to 10 the actions explained above for achieving color uniformity and color fidelity are illustrated once again with reference to a simple example.

Figure 6:
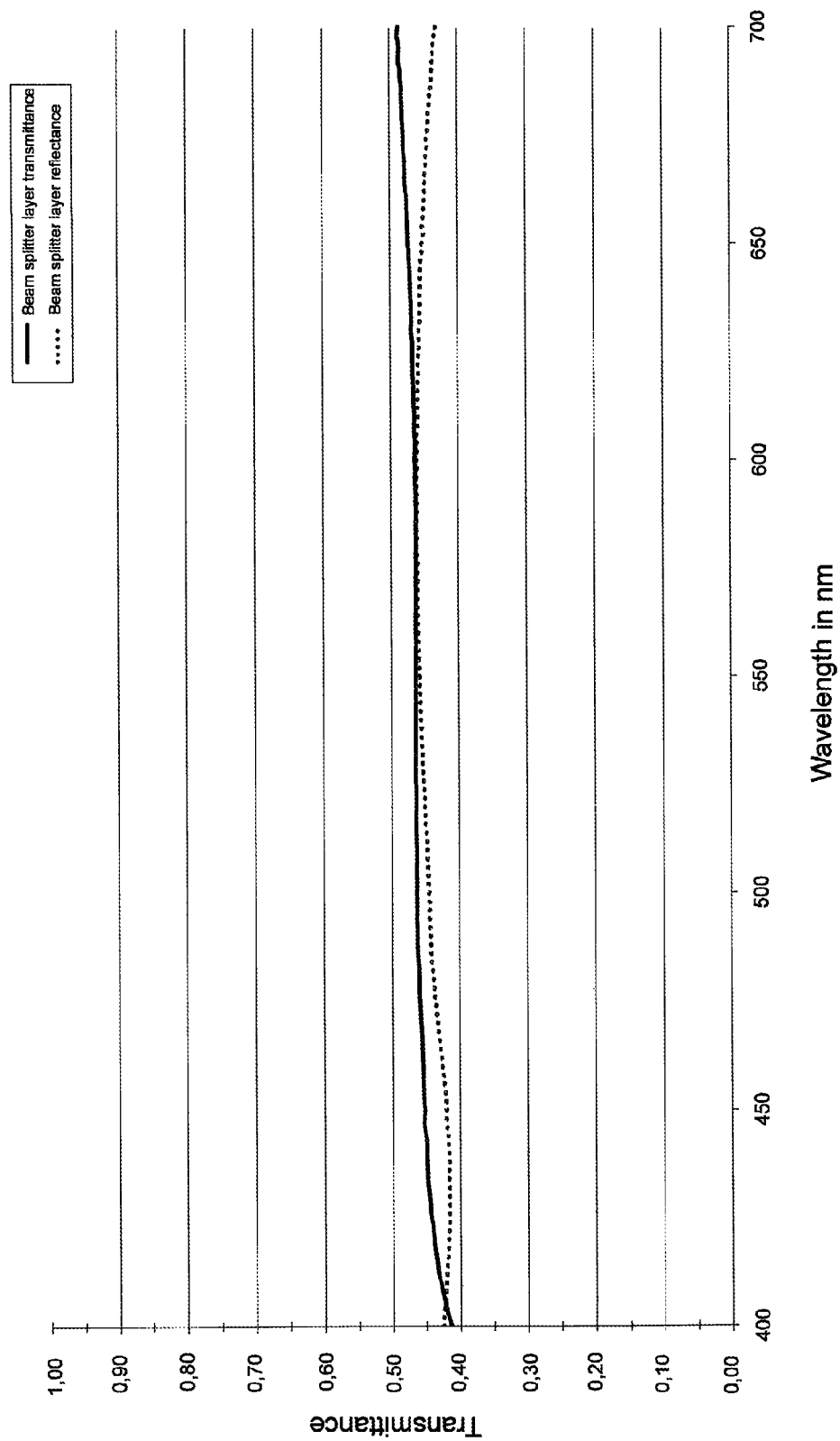
FIG. 6 is a diagram showing the wavelength-dependent reflectance and wavelength-dependent transmittance of a beam splitter layer.

FIG. 6 shows the wavelength-dependent reflectance and wave-length dependent transmittance of a typically utilized beam splitter layer as represented, for example, by beam splitter layer 18 in the optical element according to FIG. 1. As may be gathered from FIG. 6, the reflectance and transmittance vary in different ways as a function of light wavelength. In this example the sum of reflectance and transmittance for each wavelength is less than 1, which means that the beam splitter layer is neither reflecting nor transmitting, but instead absorbing, a portion of the incident light.

Figure 7:
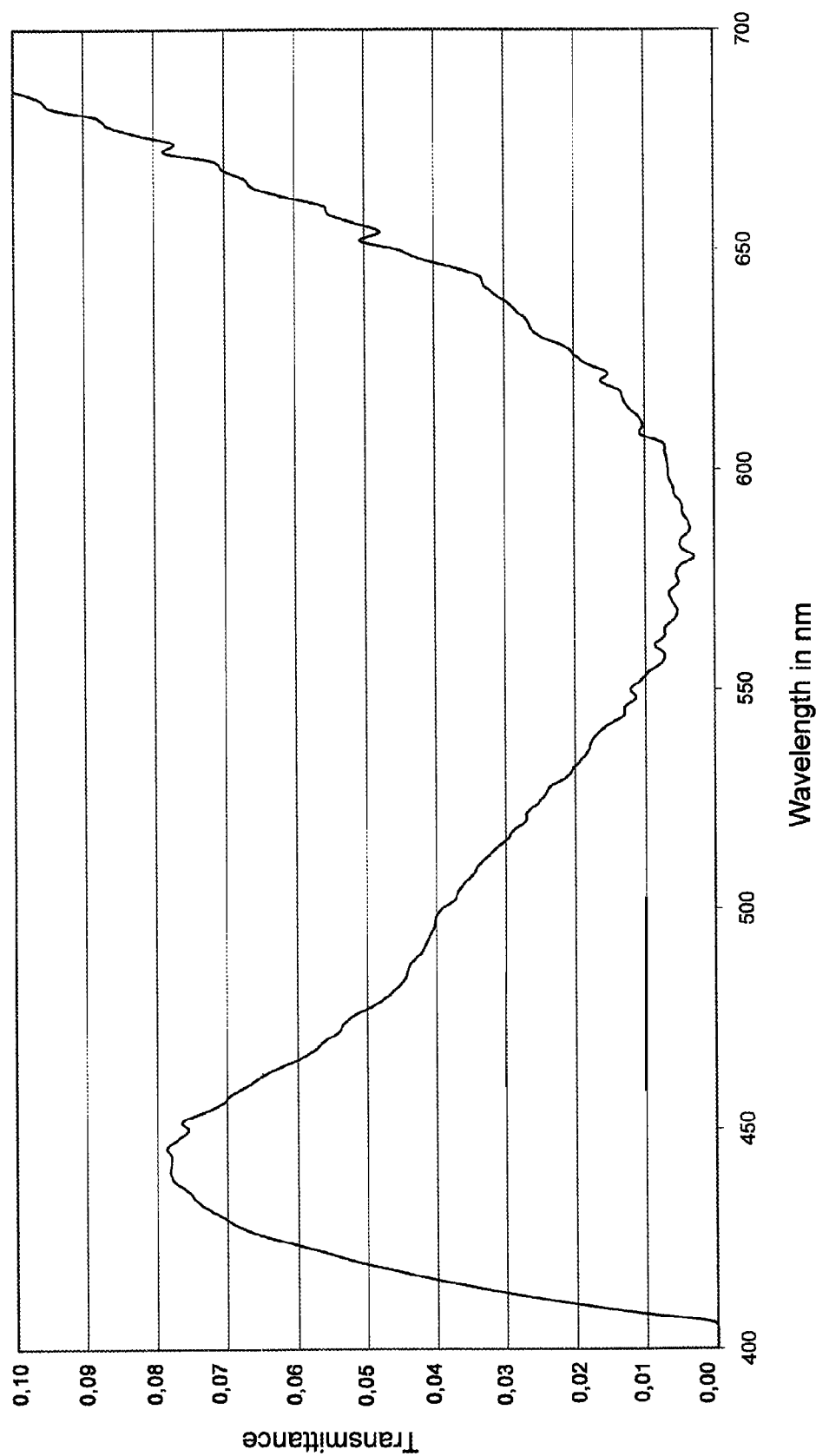
FIG. 7 is a diagram showing the wavelength-dependent reflectance of a compensation layer in order to achieve color uniformity.

FIG. 7 depicts the wavelength-dependent reflectance of a light entrance surface that is furnished with a compensation layer according to the present invention for color uniformity correction. This light entrance surface can be, for example, surface 20 shown in FIG. 1, it being assumed in this example that the correction for color uniformity is brought about solely by way of this layer. In that case, in condition (1) only transmittance $T_1$ is wavelength-dependent, while transmittance $T_2$ is constant in the working wavelength range under consideration. Be it noted that FIG. 7 depicts not transmittance, but reflectance. The transmittance nevertheless results, optionally in consideration of a not insignificant absorbance, directly from the reflectance depicted. (If the compensation layer is made up of one or more dielectric reflection-reducing layers, absorption is then as a rule negligibly low.)

Figure 8:
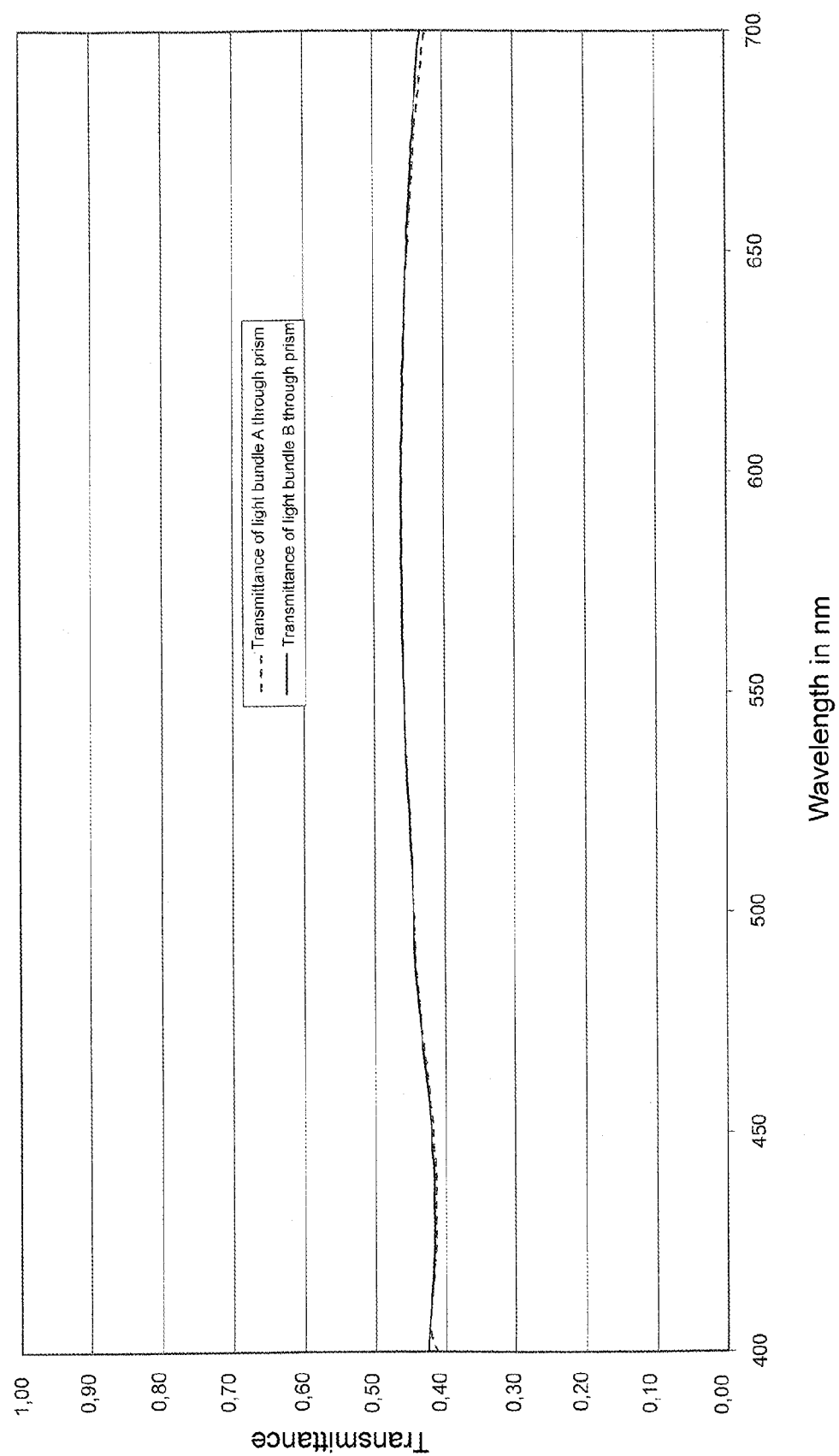
FIG. 8 is a diagram showing the wavelength-dependent transmittance of an optical element according to the present invention corrected for color uniformity.

FIG. 8 shows the transmittance values, corrected for color uniformity in accordance with condition (1), with reference to entrance light bundles A and B depicted in FIG. 1. As is evident from FIG. 8, these transmittance values are identical in the working wavelength ranges under consideration, with the result that the desired color uniformity is attained.

Figure 9:
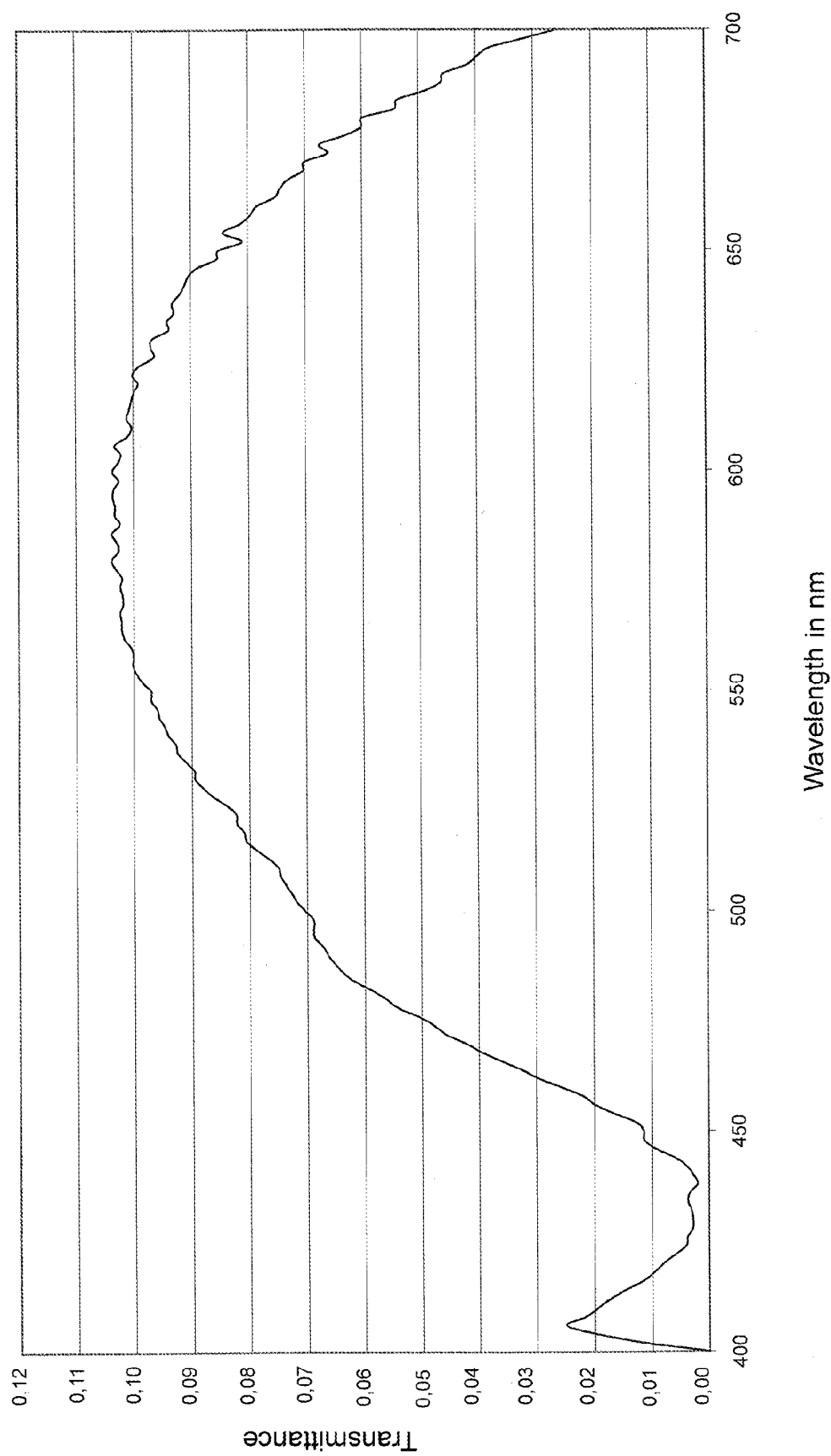
FIG. 9 is a diagram showing the wavelength-dependent reflectance of a compensation layer in order to achieve color fidelity.

FIG. 9 shows the wavelength-dependent reflectance of a light exit surface that is furnished with a compensation layer which is designed to bring about color fidelity in accordance with conditions (2). This compensation layer corresponds, for example, to layer 32 shown in FIG. 1, which is applied onto light exit surface 24. Once again, the transmittance indicated in condition (2) results directly (optionally in consideration of a not insignificant absorbance) from the reflectance depicted in FIG. 9.

Figure 10:
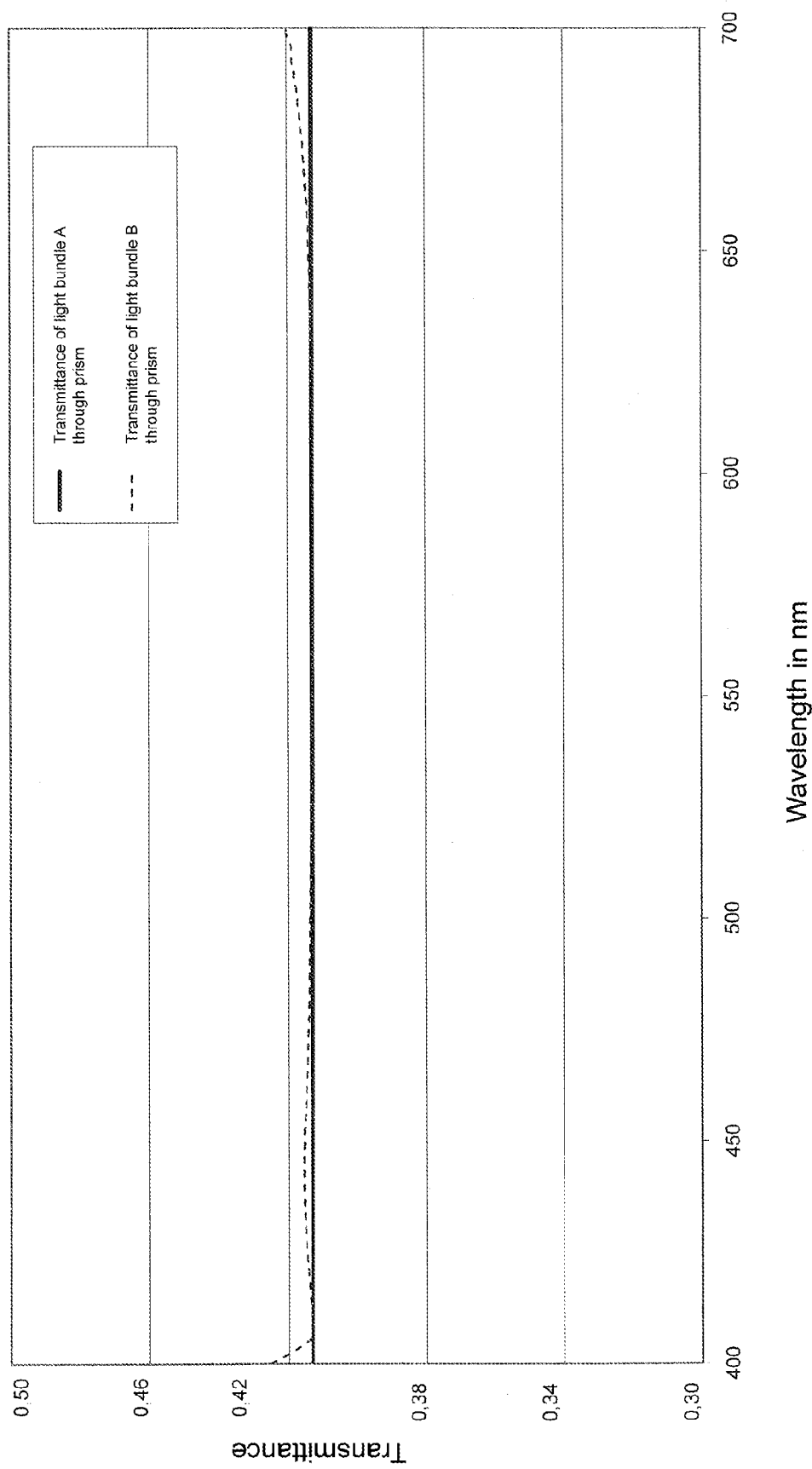
FIG. 10 is a diagram showing the transmittance of an optical element according to the present invention corrected for color fidelity.

Lastly, FIG. 10 depicts the transmittance values of the optical element corrected for color fidelity, with regard to the two light entrance bundles A and B shown in FIG. 1. As FIG. 10 shows, these transmittance values are not only identical but also wavelength-independent in the working wavelength range under consideration.

Figure 11:
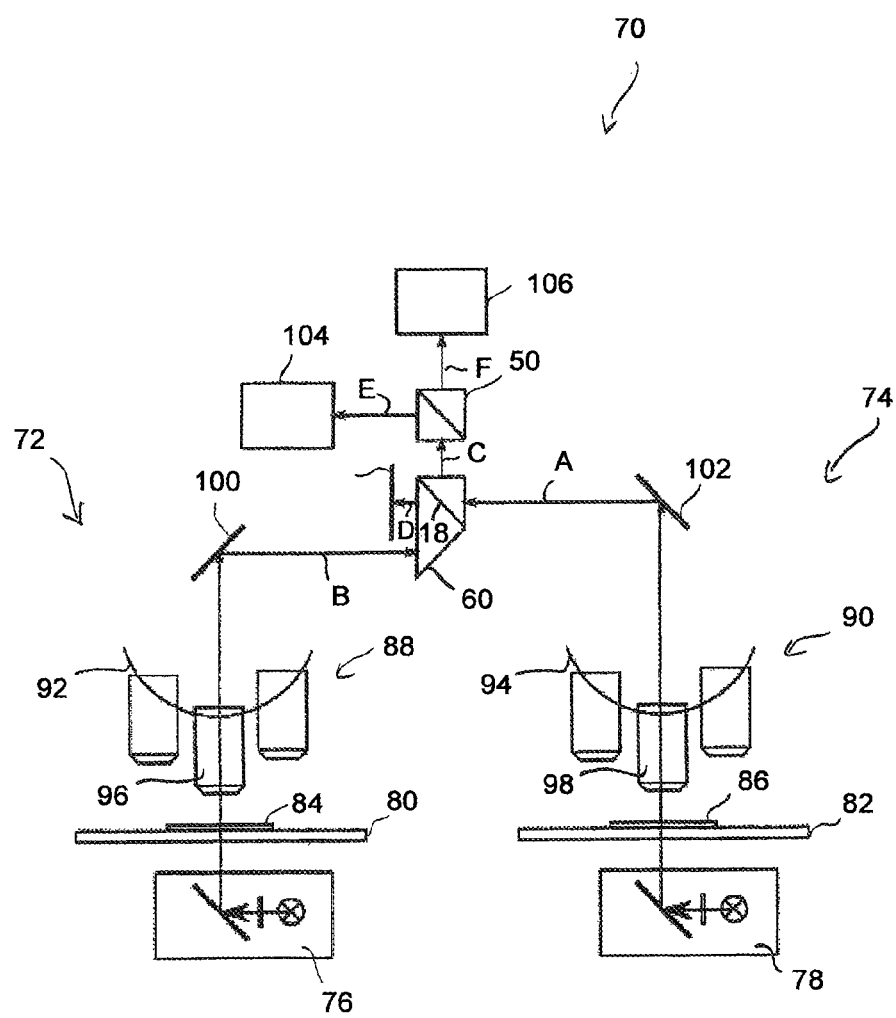
FIG. 11 schematically depicts a comparison microscope that comprises an optical element embodied as a combining prism and an optical element embodied as a beam splitter, according to the present invention.

FIG. 11 shows a comparison microscope 70 in which optical elements of the kind recited above are utilized.

Comparison microscope 70 encompasses a first microscope 72 and a second microscope 74 substantially identical in construction thereto. The two microscopes 72 and 74 each comprise a respective illumination module 76, 78, a respective specimen carrier 80, 82 having a respective specimen 84, 86 applied thereonto, and a respective objective optic 88, 90 that is constituted from a respective objective turret 92, 94 on which are mounted multiple respective objectives 96, 98 that can be selectably introduced into each microscope beam path.

Comparison microscope 70 further comprises an optical coupling apparatus that encompasses as functionally important components, in addition to two minors 100 and 102, combining prism 60 according to FIG. 5 as well as beam splitter 50 according to FIG. 4.

Combining prism 60 ensures that light bundles A and B according to FIG. 5 deriving respectively from the two microscopes 72 and 74 are combined in color-faithful fashion to yield light bundle C. Beam splitter 50, on the other hand, causes the light bundle C that enters it to be split, in accordance with FIG. 4, into two light bundles E (corresponding to B in FIG. 4) and F (corresponding to C in FIG. 4). In the example shown in FIG. 11, light bundle E is delivered to a CCD camera 104, while light bundle F enters an eyepiece 106.

The portion of light bundle A labeled D in FIG. 11, which passes through beam splitter layer 18 of combining prism 60, is absorbed by a beam block 108.

Lastly, the table below provides an example of the concrete configuration of a compensation layer according to the present invention. In this example, the compensation layer is made up of five dielectric reflection-reducing layers that are applied successively onto a substrate. The substrate is represented by a light entrance surface or light exit surface of the optical element. The table indicates both the thicknesses and the materials of which the five layers are made.

It is self-evident that the layer structure indicated in the table is to be understood purely as an example. Other layer structures made of fluoride- and/or oxide-based dielectric materials, with a lesser or greater number of layers for the overall package, are therefore possible. Also conceivable is embodiment of a combined layer structure made of dielectric and metallic layers, in order to attain a spectrally partial absorption that is adapted to the spectral behavior of the beam splitter layer.

| Substrate | | |
| --- | --- | --- |
| Layer no. | Thickness (nm) | Material |
| 1 | 35.72 | $SiO_2$ |
| 2 | 46.47 | $Al_2O_3$ |
| 3 | 93.96 | $TiO_2$ |
| 4 | 36.31 | $SiO_2$ |
| 5 | 11.2 | $TiO_2$ |
| | Air | |

What is claimed is:

1. An optical element for distributing light that has a predefined spectral energy distribution in a predetermined working wavelength range, the optical element comprising:
a transparent body into which the light enters, the transparent body comprising a beam splitter layer embodied inside the transparent body, the beam splitter layer having a predefined wavelength-dependent reflectance in the working wavelength range with which it reflects the light entering the transparent body in order to generate a reflected exit light bundle, and a wavelength-dependent transmittance with which the beam splitter layer transmits the light entering the transparent body in order to generate a transmitted exit light bundle; and
a compensation layer arrangement embodied on the transparent body separately from the beam splitter layer, the compensation layer arrangement having transmittance with regard to the light passing through the compensation layer arrangement defined as a function of the reflectance and transmittance of the beam splitter layer in such a way that the reflected exit light bundle and the transmitted exit light bundle have, within the working wavelength range, matching spectral energy distributions that differ from one another at most by an amount equal to a wavelength-independent offset value.

2. The optical element according to claim 1, wherein the transmittance of the compensation layer arrangement is defined so that the reflected exit light bundle and the transmitted exit light bundle have, within the working wavelength range, spectral energy distributions that respectively match the predefined spectral energy distribution of the light entering the transparent body, and differ therefrom at most by an amount equal to a wavelength-independent offset value.

3. The optical element according to claim 1, wherein the compensation layer arrangement encompasses at least one dielectric reflection-reducing layer.

4. The optical element according to claim 1, wherein:
the optical element is a prism embodied to combine a first and a second entrance light bundle, the transparent body having a first light entrance surface, a second light entrance surface, and a light exit surface;
the compensation layer arrangement encompasses a first compensation layer embodied on the first light entrance surface and a second compensation layer embodied on the second light entrance surface;
the beam splitter layer reflects the first entrance light bundle entering through the first light entrance surface furnished with the first compensation layer onto the light exit surface of the transparent body to generate the reflected exit light bundle, and transmits the entrance light bundle entering through the second light entrance surface furnished with the second compensation layer onto the light exit surface to generate the transmitted exit light bundle, and
within the working wavelength range, the following condition is met:

$$T_1(\lambda)*R_{STS}(\lambda)=T_2(\lambda)*T_{STS}(\lambda)+c1,$$

in which
$T_1(\lambda)$ designates the wavelength-dependent transmittance, at a wavelength $\lambda$, of the first light entrance surface furnished with the first compensation layer,
$T_2(\lambda)$ designates the wavelength-dependent transmittance, at wavelength $\lambda$, of the second light entrance surface furnished with the second compensation layer,
$R_{STS}(\lambda)$ designates the wavelength-dependent reflectance, at wavelength $\lambda$, of the beam splitter layer,
$T_{STS}(\lambda)$ designates the wavelength-dependent transmittance, at wavelength $\lambda$, of the beam splitter layer, and
c1 designates a constant where $-1<c1<1$.

5. The optical element according to claim 3, wherein the compensation layer arrangement further encompasses a third compensation layer that is embodied on the light exit surface of the transparent body, and the following condition is met within the working wavelength range:

$$T_1(\lambda)*R_{STS}(\lambda)*T_3(\lambda)=c2,$$

in which
$T_3(\lambda)$ designates the wavelength-dependent transmittance, at wavelength $\lambda$, of the light exit surface furnished with the third compensation layer, and
c2 designates a constant where $0<c2<1$.

6. The optical element according to claim 4, wherein within the working wavelength range, the following conditions are met:

$$T_1(\lambda)*R_{STS}(\lambda)=c3$$

$$T_2(\lambda)*T_{STS}(\lambda)=c4,$$

in which c3 designates a constant where 0<c3<1, and c4 designates a constant where 0<c4<1.

7. The optical element according to one of claim 1, wherein
- the optical element is a beam splitter embodied to split an entrance light bundle into the transmitted exit light bundle and the reflected exit light bundle, the transparent body of which beam splitter has a light entrance surface, a first light exit surface, and a second light exit surface,
- the compensation layer arrangement encompasses a first compensation layer embodied on the first light exit surface and a second compensation layer embodied on the second light exit surface,
- the beam splitter layer reflects a portion of the entrance light bundle entering through the light entrance surface onto the first light exit surface in order to generate the reflected exit light bundle, and transmits a portion of the entrance light bundle entering through the light entrance surface onto the second light exit surface in order to generate the transmitted exit light bundle, and
- within the working wavelength range the following condition is met:

$$R_{STS}(\lambda)*T_1(\lambda)=T_{STS}(\lambda)*T_2(\lambda)+c5,$$

in which $R_{STS}(\lambda)$ designates the wavelength-dependent reflectance of the beam splitter layer at wavelength $\lambda$, $T_{STS}(\lambda)$ designates the wavelength-dependent transmittance of the beam splitter layer at wavelength $\lambda$, $T_1(\lambda)$ designates the wavelength-dependent transmittance of the first light exit surface furnished with the first compensation layer, $T_2(\lambda)$ designates the wavelength-dependent transmittance of the second light exit surface furnished with the second compensation layer, and c5 designates a constant where −1<c5<1.

8. The optical element according to claim 7, wherein within the working wavelength range the following conditions and are met:

$$R_{STS}(\lambda)*T_1(\lambda)=c6$$

$$T_{STS}(\lambda)*T_2(\lambda)=1-c6,$$

in which c6 designates a constant where 0<c6<1.

9. An optical device for comparative viewing of two objects, having two microscope optics of identical design that each generate an entrance light bundle in order to image the respective object, and
- an optical coupling apparatus that combines the two entrance light bundles into one exit light bundle for comparative viewing of the two objects, wherein the optical coupling apparatus comprises an optical element, embodied as a prism, according to claim 4 in order to combine the two entrance light bundles.

10. The optical device according to claim 9, wherein the optical coupling apparatus comprises an optical element, arranged after the prism and embodied as a beam splitter, in order to split the exit light bundle generated by the prism.

* * * * *